United States Patent [19]

Commander et al.

[11] Patent Number: 5,872,246

[45] Date of Patent: Feb. 16, 1999

[54] ETHYL GUAR

[75] Inventors: J. Richard Commander, Chester, Va.; Thomas George Majewicz, Kennett Square, Pa.

[73] Assignee: Aqualon Company, Wilmington, Del.

[21] Appl. No.: 324,032

[22] Filed: Oct. 17, 1994

[51] Int. Cl.$^6$ ....................................................... C07H 1/00
[52] U.S. Cl. ............................ 536/124; 536/114; 536/127
[58] Field of Search ...................................... 536/119, 129, 536/127

[56] References Cited

U.S. PATENT DOCUMENTS

| | | | |
|---|---|---|---|
| 4,169,945 | 10/1979 | DeGuia et al. | 536/119 |
| 4,547,570 | 10/1985 | Garner | 536/84 |

FOREIGN PATENT DOCUMENTS

| | | |
|---|---|---|
| 636800B | of 1991 | Austria . |
| 277499 | of 1988 | European Pat. Off. . |
| 481240 | of 1991 | European Pat. Off. . |
| 3602151 | of 1987 | Germany . |

OTHER PUBLICATIONS

Abstracts Bulletin of the Institute of Paper Chemistry, Pishmanova TS. et al., Preparation of Ethylcellulose, vol. 42, No. 6, Dec. 1971, p. 539 and Tseluloza Hartiya 1, Sep./Oct. 1970, No. 5, pp. 19–22.

Review of Current Literature on the Paint and Allied Industries, Sun P. J., Industrial Method for the Production of Ethylcellulose, vol.39, No.289, Jul. 1, 1996, pp. 667–668 and Hua Hsueh Shih Chieh, vol. 18, No. 12, 1964, pp. 552–555.

*Primary Examiner*—Elli Peselev
*Attorney, Agent, or Firm*—David Edwards

[57] ABSTRACT

A process is provided for making alkylated galactomannans comprising reacting a galactomannan in the presence of sodium hydroxide, water, and an alkyl halide to form a reaction mass under pressure and at temperatures greater than 50° C. in amounts and for a time sufficient to achieve a degree of substitution greater than 2.4. Organic volatiles from the reaction mass are stripped and the reaction mass is then washed in water at temperatures high enough to prevent dissolution or agglomeration of the alkylated galactomannan. This washed product is then dried and pulverized to suitable particle size. This product is useful in applications requiring thickening and rheology modification of formulations containing organic solvents or formation of coatings/film from organic solvents. The products are also useful in pharmaceutical applications.

18 Claims, No Drawings

ETHYL GUAR

FIELD OF THE INVENTION

This invention relates to a process for manufacturing purified alkylated galactomannans having high degrees of substitution that are soluble in organic solvents.

BACKGROUND OF THE INVENTION

Galactomannans are a class of polysaccharides composed of galactose and mannose. In general, the structure of the polymers consist of a linear chain of 1,4-linked beta D-mannopyranosyl units with single-membered alpha-D-galactopyranosyl units linked through the 1,6 positions. Galactomannans vary in the extent and uniformity of substitution with respect to their galactose moieties For example, the two most common galactomannans are guar and locust bean gums. Guar has a galactoae:mannose ratio approximating 1:2 locust bean gum has a ratio of about 1:4. Both are soluble in water, but the greater number of galactose units on guar imparts better cold water solubility; locust bean gum requires heating to dissolve thoroughly.

Water-soluble other derivatives of galactomannans are also well-known and commercially available—common examples being carboxymetyl-, hydroxypropyl-, and hydroxyethyl-. Such derivatives contain relatively low degrees of substitution (DS) of the modifying reagent, generally less than 1.0 DS (out of a maximum DS of 3), and are not soluble in common or organic solvents. These modifying groups are added at low levels to alter aqueous solution rheology or impart ionic character to the galactomannan.

High DS etherified and/or esterified galactomannans are described in Australian Patent AU-636800-B (and its counterpart German Patent Application P 40 33 041.9). These derivatives are substituted to DS values greater than about 2.4 with $C_1$–$C_6$ alkoxy, phenyl $C_1$–$C_4$ alkoxy or phenoxy groups, and ester groups of $C_3$–$C_{16}$ alkanoyloxy groups. These derivatives are soluble in organic solvents, and are claimed to be useful in pharmaceutical preparations. However, the process used to make the high DS products is extremely laborious, complicated, and uneconomical. Examples given for preparing methylated and ethylated derivatives describe a process wherein a protein-free galactomannan is first dissolved in water and reprecipitated in methanol. After filtration, the wet-cake is added to dimethylsulfoxide and the residual methanol is aspirated off. Solid sodium hydroxide in then added followed by the modifying alkylating reagent, such as methyl iodide or ethyl bromide. The mixture is stirred at 20°–25° C. for 48 hours. It is stated that reaction temperatures higher than about 35° C. are undesirable because of the formation of yellow colored byproducts. Undissolved material is then separated and the supernatant treated in a rotary evaporator to remove dimethylsulfoxide. The residue is then treated with ether, filtered to remove undissolved material, then concentrated on a rotary evaporator until the polymer precipitates. The polymer is filtered, dissolved in methanol, reprecipitated in hot water, and finally dried.

U.S. Pat. No. 4,169,945 describes another process for making alkyl ethers of galactomannans specifically requiring the presence of a quaternary ammonium halide phase-transfer reagent in the reaction. Though this patent claims that the process is suitable for preparing galactomannans having degrees of substitution between 0.01 to 3.0, the examples are only enabling for low DS water soluble products, i.e., DS less than about 1.0. The sentence in lines 24–28, column 4, attests to the fact that their process is specific to producing water soluble derivatives: "If more than the optimum quantity of water is present in this type of reaction medium, then the polygalactomannan gum may swell or enter solution, thereby complicating product recovery and purification". The process disclosed in this patent may be conducted in water or in a two phase reaction system comprising water and a water miscible solvent.

SUMMARY OF THE INVENTION

The present invention is directed to a process for making alkylated galatomannans comprising
 a) reacting a galactomannan in the presence of sodium hydroxide, water, and an alkyl halide to form a reaction mass under pressure and at temperatures greater than 50° C. in amounts and for a time sufficient to achieve a degree of substitution greater than 2.4,
 b) stripping organic volatiles from the reaction mass,
 c) washing the reaction mass with water at temperatures high enough to prevent dissolution or agglomeration of the alkylated galactomannan, and
 d) drying and pulverizing the dried alkylated galactomannan to suitable particle size.

This invention is also related to the product that is prepared by the process mentioned above.

DETAILED DESCRIPTION OF THE INVENTION

A much more practical and economical process over prior art has been found for manufacturing high DS alkylated galactomannans. The alkylated galactomannans produced by the process of this invention are soluble in many organic solvents, and are useful in applications requiring thickening and rheology modification of formulations containing organic solvents or formation of coatings/film from organic solvents. The products are also useful in pharmaceutical applications.

The process of the present invention comprises simply reacting a mixture of galactomannan with sodium hydroxide, water, and alkylating reagent in a stirred pressure-autoclave at elevated temperatures to give a product, followed by stripping off volatile byproducts, washing the product in water, and drying. Optionally, an inert water-immiscible diluent may be added to the reaction phase.

According to this invention, the galactomannans suitable as starting materials are commercially available forms of guar or locust bean gum. The preferred starting material is in the form of a powdered or granular material. In a typical reaction, the galactomannan is first mixed with base and water in a stirred pressure vessel and inertized with an inert gas such as nitrogen or argon. The extent of inertization, i.e., removal of oxygen, affects the ultimate molecular weight of the final product. It is well known to one skilled in the art that oxygen in the presence of alkali will occasion molecular weight degradation of polysaccharides—the extent being dependent on the concentrations of oxygen and sodium hydroxide. Since alkali is necessary to promote the reaction with the alkylating reagent, the highest molecular weights are retained by rigorous removal of as much oxygen as possible from the system. Lower molecular weight can be achieved, if desired, by less rigorous exclusion of oxygen or purposeful injection of air into the reaction mass.

An alternative method for producing lower molecular weight products is to add a chemical oxidant, such as an inorganic peroxide like hydrogen peroxide or an organic peroxide like t-butyl hydroperoxide, to the reaction mass. The use of chemical oxidants, particularly in combination with metal-ion catalysts such as iron and cobalt, to reduce molecular weight of polysaccharides is also well known in the art.

In the present invention, the base is preferably an alkali metal hydroxide such as sodium hydroxide. The concentration of the base and the concentration of water added to the galactomannan are variables affecting the ultimate degree of substitution of the product and the reacting efficiency of the alkylating reagent. The concentrations can vary widely depending on the desired degree of substitution and the nature and concentration of the alkylating agent. The presence of an inert diluent may also be a factor in determining the concentration of the base. The use of an excess amount of sodium hydroxide above the stoichiometric amount required to achieve the desired degree of substitution is preferred in this invention.

In this invention, an inert diluent in not necessary, but may be added to aid stirrability of the reaction mass and promote better heat transfer. Preferred diluents are immiscible with water and are unreactive to the base or alkylating reagent. Most preferred diluents are aliphatic or aromatic hydrocarbon solvents such as heptane, toluene, or xylene.

As the next step in the process of the present invention, an alkylating reagent is added to the alkalized galactomannan slurry and reacted at elevated temperature. The preferred alkylating reagent is an alkyl halide or mixtures thereof, wherein the alkyl group is methyl, ethyl, or propyl and the halide is chloride, bromide, or iodide. For practical considerations, methyl chloride and ethyl chloride are preferred, with ethyl chloride being most preferred. The concentration of the alkyl halide can vary widely depending on the desired degree of substitution, alkylating reagent, presence of a diluent, reaction time and temperature, and concentrations of sodium hydroxide and water in the reaction mixture. All these factors can affect the reaction efficiency of the alkyl halide with the galatomannan. It is the reaction efficiency of the alklyating reagent under the reaction conditions and desired degree of substitution that determines the concentration of the alkylating reagent. A preferred mode of operation uses an excess of alkylating reagent above and beyond that required to achieve the desired degree of substitution. Unreacted alkylating reagent at the end of the reaction may be recovered and recycled.

With these considerations in mind and the realization that reagent concentrations can vary widely within the spirit of this invention, a preferred process for manufacturing organo-soluble ethylated galactomannan with an ethyl DS greater or equal to about 2.4 uses about 5.0 to 8.0 parts sodium hydroxide to 1 part galactomannan, about 4.0 to 6.5 parts water to 1 part galactomannan, and about 3.0–5.0 parts ethyl chloride to 1 part galactomannan.

In the most preferred process, the sodium hydroxide is predissolved in the water before being added to the galactomannan. About 11.5 parts of sodium hydroxide solution to 1 part galactomannan is used, and the ethyl chloride is in the range of about 3.5 to 4.5 parts. The ethyl DS is varied by adjusting the strength of the sodium hydroxide-water solution from about 45 to 65 wt % sodium hydroxide or by varying the amount of ethyl chloride charged to the reactor.

After adding the sodium hydroxide, water, and ethyl chloride to the pressure reactor, and optionally any molecular weight degrading reagent, the pressure reactor is sealed and heated. The reaction time and temperature can vary widely depending on the specific alklyating reagent used. In a preferred process using ethyl chloride to make ethylated galactomannan, the reactor is heated slowly to 90°–100° C. over 4 hours, held at that temperature for 1–3 hours, then heated slowly to 140° C. over about 3 hours, and held at that temperature for 1–2 hours.

Alternatively, the reactor may be heated slowly to about 140° C. over about 5 hours and held at that temperature for about 3 hours. The pressure at the end of the reaction may reach as high as 500 psi. The reactor is then slowly vented while at 130°–140° C. to remove volatile organic components.

After venting, the reactor is cooled and discharged. The crude product is then washed with water to remove water-soluble components. The temperature of the water during washing will vary depending on the DS of the product. For ethylated galactomannans with DS values greater than about 2.7, the temperature of the water can be as low as about 25° C. For products with DS values less than about 2.6, it is preferred that the water temperature be greater than about 40° C. to inhibit excessive swelling of the product. During washing, an acid such as acetic or hydrochloric acid, may be added to neutralize residual sodium hydroxide. Also, an oxidizing agent such as an organic or inorganic peroxide may be added to degrade the molecular weight of the alkylated galactomannan. Washing with water, either in batch or continuous mode, is continued until the desired level of purity is achieved. Thereafter, the product is dried and ground to the desired particle sizes.

In accordance with this invention, the alkylated galactomannans produced from this process have an alkyl degree of substitution (DS) greater than 2.4 and are soluble in, and effectively thicken, many organic solvents. Typical organic solvents which ethyl guar is soluble in, include alcohols such as methanol and ethanol and furfuranols, ketones such as methyl ethyl ketone and acetone, aromatic hydroxcarbons such as toluene, cycloalphatic hydrocarbons such as limonene and pinene, esters such as ethyl acetate, isopropyl palmitate and alkyl benzoates, and polar aprotic solvents such as acetonitrile and dimethylformamide. Ethyl guar is poorly soluble in aliphatic hydrocarbon solvents such as heptane, but is soluble in mixtures of aliphatic and aromatic hydrocarbon solvents.

Materials with DS values greater than about 2.6 are insoluble in water at about 25° C., but become partially or mostly soluble at temperatures less than about 20° C. Materials with DS values less than about 2.6 are partially or mostly soluble in water at about 25° C., but phase out of solution and are insoluble at temperatures between about 25° C. and 35° C.

The ethyl guars of this invention also tend to be thermoplastic and can be thermally-compressed into coherent films at about 175° C.

EXAMPLE 1

Preparation of Ethylated Guar DS=2.9

A 10-gallon autoclave with an agitator therein was preheated to 75° C. A nitrogen sparge was introduced. The reactor was charged with 43.5 lb of sodium hydroxide pellets or flake and 25.5 lb of water (63% solution). After dissolution of the sodium hydroxide, the vessel was cooled to 75° C. and 6 lb of guar flour was added to the autoclave with the agitator turned on. The nitrogen sparge was removed, and the reactor was sealed. The reactor was further purged with nitrogen to remove the oxgyen above the liquid phase in the reactor and then 26.4 lb of ethyl chloride was added. The reactor was heated at a constant rate to 140° C. over 5 hours, and then held at 140° C. for 3 hours. The reactor was then vented at a constant rate over 1 hour while maintaining the temperature at 130°–140° C. The reacted mass was then cooled to about 50° C., dumped from the reactor, and batch washed with water. Acetic acid was used in the final washes to adjust the pH of the water slurry to 6–8. The purified product was dried and ground. It had a degree of substitution of 2.9.

EXAMPLE 2

Preparation of Ethylated Guar DS=2.8

The same procedure was followed as in Example 1 except that 40 lb of sodium hydroxide and 29 lb of water (58% solution) were used in the reaction.

EXAMPLE 3

Preparation of Ethylated Guar DS=2.7

The same procedure was followed as used in Example 1 except that 35.9 lb of sodium hydroxide and 33.1 lb of water (52% solution) were used in the reaction.

EXAMPLE 4

Preparation of Ethylated Guar DS=2.6

The same procedure was followed as used in Example 1 except that 32.4 lb of sodium hydroxide and 36.1 lb of water (47% solution) were used in the reaction.

EXAMPLE 5

Preparation of Ethylated Guar Using a Different Heating Schedule

The same procedure was followed as used in Example 1 except that the reaction was heated to 100° C. over 2 hours, held at 100° C. for 2 hours, then heated to 140° C. over 3 hours and held at 140° C. for 1½ hours. The products produced by this schedule typically had a DS between 2.8 and 2.9.

EXAMPLE 6

Preparation Ethylated Locust Bean Gum

The same procedure was followed as used in Example 1 except that locust bean gum flour was used instead of guar. The final product had a DS of 2.7.

What is claimed is:

1. A process for making alkylated galactomannans consisting essentially of
    a) reacting a galactomannan in the presence of sodium hydroxide, water, and at least one alkyl halide to form a reaction mass heated at temperatures greater than 50° C. in amounts and for a time sufficient to achieve a degree of alkyl substitution of greater than 2.4,
    b) stripping organic volatiles from the reaction mass,
    c) washing the reaction mass with water at temperatures high enough to prevent dissolution or agglomeration of the alkylated galactomannan, and
    d) drying and pulverizing the dried alkylated galactomannan to desired particle size.

2. The process of claim 1, wherein the reaction takes place in the presence of a diluent.

3. The process of claim 2, wherein the diluent is selected from the group consisting of aliphatic and aromatic hydrocarbons.

4. The process of claim 3, wherein the diluent is toluene or xylene.

5. The process of claim 1, wherein the reaction mass is neutralized with an acid after the stripping step during washing with water.

6. The process of claim 5, wherein the acid is either an organic acid or a mineral acid.

7. The process of claim 1, wherein the alkyl portion of the alkyl halide independently is selected from the group consisting of methyl, ethyl, propyl and mixtures thereof.

8. The process of claim 1, wherein the alkyl portion of the alkyl halide is ethyl.

9. The process of claim 7, wherein the halide portion of the alkyl halide is selected from the group consisting of chloride, bromide, and iodide.

10. The process of claim 1, wherein the galactomannan is selected from the group consisting of guar gum and locust bean gum.

11. The process of claim 1, wherein the temperature of the water during the washing step is greater than 40° C.

12. The process of claim 1, wherein an oxidizing agent is added either to the reaction step or to the washing step in order to oxidatively degrade the alkylated galactomannan and reduce its molecular weight.

13. The process of claim 12, wherein the oxidizing agent is selected from the group consisting of i) oxygen in the presence of caustic, ii) inorganic peroxides, and iii) organic peroxides.

14. The process of claim 13, wherein the oxidizing agent is hydrogen peroxide.

15. The process of claim 14, wherein the oxidizing agent is added during the washing step.

16. The process of claim 12, wherein the oxidizing agent is air and is added during the reaction step.

17. The process of claim 1, wherein the reaction is conducted under an inert atmosphere.

18. The process of claim 1, wherein the inert atmosphere is created with nitrogen.

* * * * *